July 19, 1949.                J. A. HOHMAN                2,476,867
           COMMINUTING APPARATUS FOR MEATS, VEGETABLES,
                         FRUITS, AND THE LIKE
Filed Dec. 9, 1946                                   2 Sheets-Sheet 1
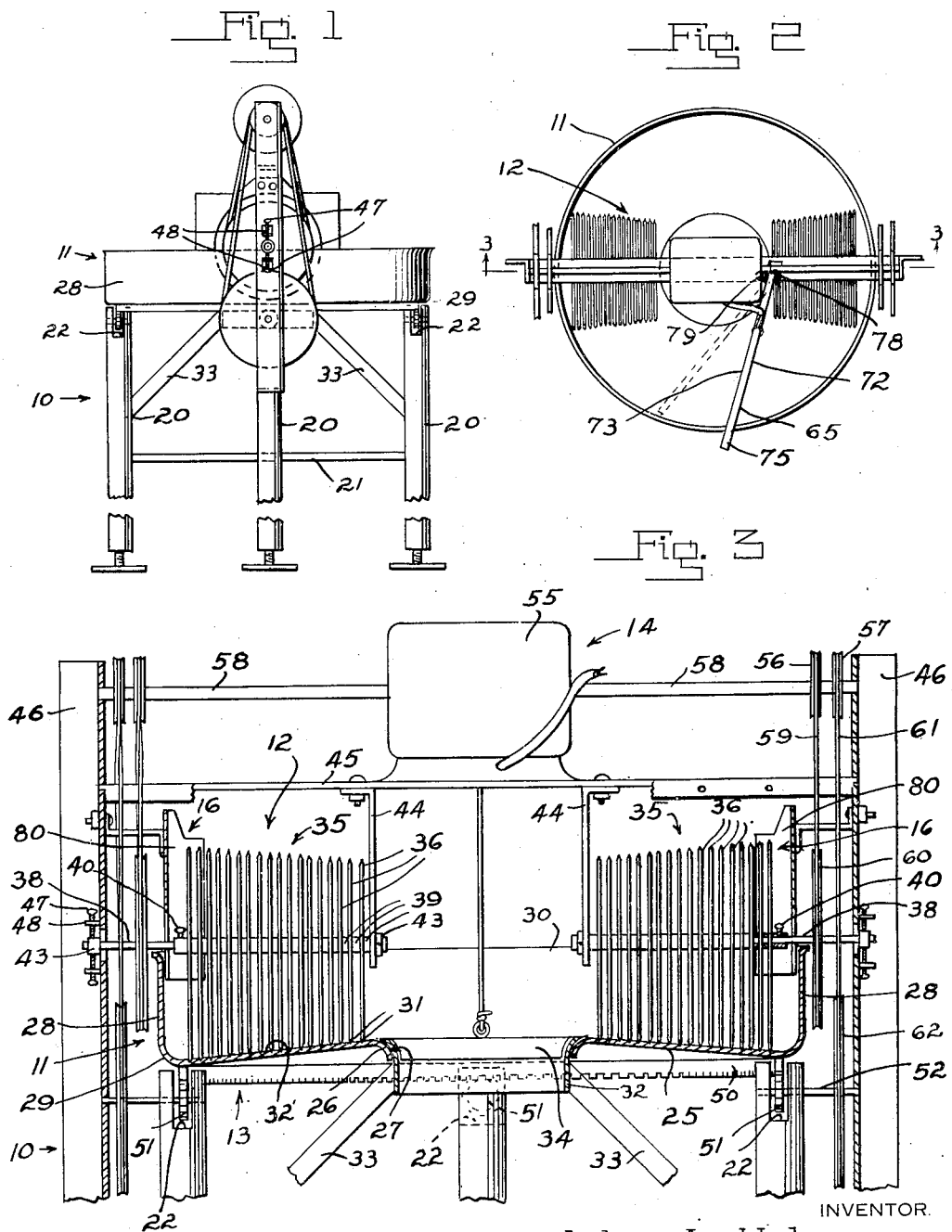

July 19, 1949.  J. A. HOHMAN  2,476,867
COMMINUTING APPARATUS FOR MEATS, VEGETABLES,
FRUITS, AND THE LIKE
Filed Dec. 9, 1946  2 Sheets-Sheet 2
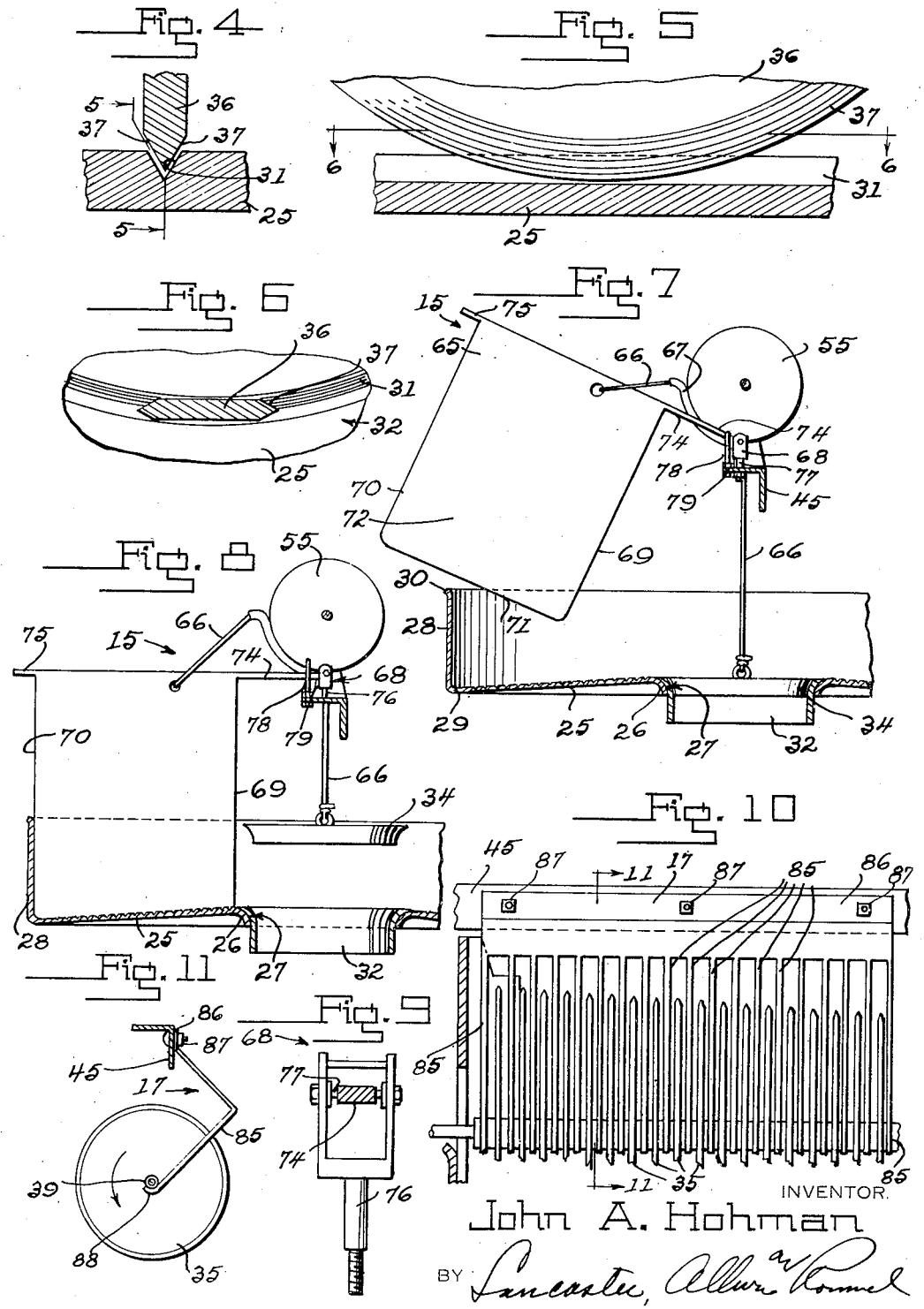

Patented July 19, 1949

2,476,867

UNITED STATES PATENT OFFICE 2,476,867

COMMINUTING APPARATUS FOR MEATS, VEGETABLES, FRUITS, AND THE LIKE

John A. Hohman, Baltimore, Md.

Application December 9, 1946, Serial No. 714,945

5 Claims. (Cl. 146—67)

This invention relates to cutting or comminuting apparatus for materials such as meats, vegetables, fruits and the like, and more particularly to such apparatus embodying spaced-apart rotary disc cutters.

An important object is to improve upon rotary disc cutter comminuting apparatus and remedy their defects, including that of being unable to properly cut material close to the bottom wall of the apparatus' housings, of allowing valuable juices to escape from the housings, and of requiring more or less complicated manual operations in the discharge of the comminuted material.

Another important object is to provide a comminuting apparatus in which there is no metal-to-metal contact of the comminuting means and housing.

Still another important object is to provide comminuting means which will cause all the material, including the material close to the inner face of the housing, to be properly and evenly comminuted.

With the structure hereinafter disclosed, including a plurality of rotary disc cutters with portions thereof disposed within circular grooves extending from the inner face of the bottom wall of the apparatus housing, the cutters are disposed with portions thereof below the plane of this inner face and in positions to cut through material contacting this inner face, yet juices are prevented from escaping, because of the walls of these grooves and the fact that the housing has but one exit, disposed with its mouth higher than any of the grooves.

These circular grooves and rotating disc cutters assembly, wherein the grooves are V-shaped, and portions of the disc cutters enter the grooves, cause the comminuted material within the grooves to be pushed therefrom by the rotating disc cutters, so that there is no accumulation of comminuted material within the grooves.

Another important object is to provide a combined means to guide the comminuted material toward the exit therefor while, at the same time, cause the closure for the exit to move to a position to uncover this exit.

Other objects and advantages of the invention will be apparent during the course of the following detailed description of the invention, taken in connection with the accompanying drawings, forming a part of this specification and in which drawings:

Figure 1 is an end elevation of the novel comminuting apparatus.

Figure 2 is a top plan thereof.

Figure 3 is an enlarged vertical section substantially on the line 3—3 of Figure 2.

Figures 4, 5 and 6 are fragments of portions of a cutter disc and the apparatus housing, showing the association of one with the other.

Figure 7 is a vertical section of the upper portion of the novel apparatus, showing a guide means and closure, with the guide means raised and the closure lowered.

Figure 8 is a like view, but with the guide means lowered and the closure raised.

Figure 9 is a view, mostly in elevation of a swivel for the guide means.

Figure 10 is a fragmentary edge elevation of the cutter discs of Figures 4, 5 and 6 with a novel comb associated therewith.

Figure 11 is a section substantially on the line 11—11 of Figure 10.

In the drawings, wherein for the purpose of illustration is shown a preferred embodiment of the invention, and wherein similar reference characters designate corresponding parts throughout the several views, the novel comminuting or cutting apparatus is shown to comprise a support 10 for a rotatable vessel 11, means 12 within the vessel to comminute material introduced therein, means 13 to rotatably carry the vessel 11, means 14 to drive the means 12 and 13, combined means 15 to guide comminuted material to the exit from the vessel 11 while, at the same time, uncover the exit. This same means 14 may be operated, of course, to cause the guide to become inoperative and the exit closed. There may be provided guard means 16 for portions of the movable structure of the apparatus and comb means 17 to remove comminuted material from the discs of the means 12.

The support 10 may be any suitable one and, in the example shown, includes a suitable number of legs 20, suitably cross braced as at 21 and each provided at its upper end with a downwardly-projecting, gear wheel-accommodating slot 22.

Upon the support 10 is rotatably mounted the vessel 11 for receiving material to be comminuted. Preferably, this vessel is seamless and of material not readily corroded nor rusted. The vessel has a bottom wall 25 which slopes upwardly from its outer edge, toward its axis of rotation, but falls short of the axial center of the vessel, where the wall may be arcuate and slightly downturned as at 26, forming a discharge mouth 27, shown particularly in Figures 3, 7 and 8. The outer edge of the bottom wall 25 is joined by an upstanding, substantially circular wall 28, with the walls 25 and 28 merging into each other, preferably along a curved juncture section 29. The upper end of the substantially circular wall 28 defines an upwardly-opening mouth 30 for the introduction of the material to be comminuted.

An important feature of the vessel 11 is the provision of a plurality of concentric grooves 31 extending downwardly from the inner face 32' of the bottom wall 25 and being substantially V-shaped as in Figure 4. The outermost of these grooves 31 is adjacent the outer edge of the bottom wall 25 and the innermost is adjacent the exit 27. Since the vessel 11 rotates and the closure (to be described) for the mouth 27 does not, there may be provided a fixed continuation of the mouth 27, being a tubular member 32 having a flared upper end, disposed within the mouth and closely adjacent the walls thereof, providing a seat for the closure. This member 32 may be supported by braces 33 secured to any convenient portion of the support 10, as a cross brace 21.

A closure 34 for the exit 27 is provided and may have a subtantially flat upper face and a skirt constructed and arranged for a snug fit against the inner face of the flared portion of the tubular member 32. The means 12 to comminute material within the vessel 11 is shown as two gangs 35 of disc cutters 36. Each gang comprises a plurality of parallel disc cutters 36, graduating in diameter, as may be seen in Figure 3 and each cutter having a beveled edge 37, as may be seen in Figure 4, with the cutters of each gang preferably mounted on a separate shaft 38, which may be square in transverse cross section, with the cutters 36 separated by spacers 39 and prevented from accidental moving longitudinally of their shaft 38 by set screws 40 extending throughout the outermost spacers and bearing against the shaft. It is now obvious that the separate cutters may be removed, for resharpening, replacing or, by the use of other spacers, separated one from another, a distance greater than one or two grooves apart.

Each cutter 36 extends into its groove 31 substantially as shown in Figures 4, 5 and 6, with slight clearances between the cutters 36 and bottoms and walls of the grooves 31. This brings the edges of the cutters below the plane of the inner face 32 of the bottom wall 25, so that these edges will also be below the bottom surfaces of material disposed upon the inner face 32' of the wall 25, and thus insures that the material will be severed right down to its bottom surfaces, yet particles of comminuted material will not pack in the grooves since they will be continuously thrown out of the grooves by the rotating cutters 36.

Preferably, the gangs 35 are disposed 180° apart and with their shafts 38 substantially axially concentric.

Bearings 43 rotatably support each end of each shaft 38 and the inner bearings 43 are, in turn supported, by hangers 44 depending from a platform or support 45 carried by arms 46 secured to the legs 20. These arms 46 (there are, preferably, two of them) also support the outer bearings 43 for the shafts 38. Preferably the shafts 38 are adjustable vertically as by adjusting screws 47 extending through the screw-threaded bores of brackets 48 carried by the hangers 44 and arms 46 and with the shanks of the screws extending into the walls of the bearings 43, and disposed 180° apart. Of course the arm 46 and hangers 44 are vertically slotted to receive the shafts 38, and permit vertical adjustment thereof.

In order to rotatably carry the vessel 11, the bottom wall thereof may carry a depending circular rack 50, with its teeth extending downwardly and meshing with the teeth of gear wheels 51 rotatably carried by the legs 20 and disposed within the slots 22. All but one or two of these gear wheels may rotate upon pivot pins, but, in the example shown, two of the wheels 51, disposed 180° apart are mounted upon shafts 52 for operative connection with the means 14 to drive them as well as drive the means 12.

The means 14 preferably includes an electric motor 55, mounted upon the platform 45 and having pulleys 56 and 57 mounted upon its shaft 58. The pulleys 56 carry belts 59 extending about pulleys 60 fixed to the shafts 38 supporting the disc cutter gangs 35, and the pulleys 57 carry belts 61 extending about pulleys 62 fixed to the gear wheel shafts 52. Rotation of the motor shaft 58 imparts rotating motion to the disc cutters 36 on substantially horizontal axes and also imparts rotary motion to the vessel 11 on its substantially vertical axis.

The means 15 to guide comminuted material to the exit from the vessel 11 while, at the same time uncover the exit is shown more particularly in Figures 7 and 8 and includes a vertically and horizontally swingable barrier or partition 65, a flexible connection 66 between this and the closure 34, a guideway 67 for the flexible connection and a swinging and stop means 68 for the barrier 65.

The barrier 65 has parallel, vertical end faces 69 and 70, and a bottom face 71 sloping from the face 69 downwardly to the face 70. There are parallel, vertical side faces 72 and 73. Extending from the end face 69 at its upper end is a horizontally-disposed arm 74 having a bore, with a substantially vertical axis, adjacent its free end. There may be a hand hold 75 projecting from, preferably, the other end face 70. The length of the barrier 65 is such that it will provide a barrier, disposed in a non-radial position with respect to the axis of rotation of the vessel 11, across the latter from closely adjacent the circular vertical wall 28 to the vertical plane of the mouth 27.

Secured to the upper end portion of the barrier 65, intermediate the end faces 69 and 70 is one end of the flexible connection 66, which may be a cord or wire. This connection extends upwardly and toward the axial center of the vessel where it enters the guideway 67 which is preferably a tubular rigid member secured to the platform 45 and extending upwardly and outwardly therefrom. The connection 66 then extends downwardly through the guideway to and through a hole in the platform and thence downwardly to the upper face of the closure 34 and is suitably secured to the closure at the vertical axial center thereof. The length of this connection 66 is such that, when the barrier 65 is in the raised position of Figure 7, the closure 34 will be seated to close the mouth 27 but when the barrier is lowered, as in Figure 8, the closure is raised to uncover the mouth 27. It is desirable that the weight of the barrier 65 be substantially the same or close to the weight of the closure 34.

In order to guide the barrier 65 in a swinging path and limit its movement, I may provide any suitable means, such as the means 68, which includes a swivel, shown particularly in Figure 9, having an upwardly forked rod 76 extending upwardly from the bore in the platform 45 and rotatable therein. Associated with the rod 76 is a horizontally disposed pivot carried by the forked portion of the rod pivotally carrying the arm 74 to retain the arm 74 of the barrier 65 either horizontal, as in Figure 8, or inclined, as in Figure 7. When disposed as in Figures 2 and 8, and the vessel 11 rotating, the comminuted material in the latter will tend to accumulate at one side face of the barrier and move toward the mouth 27 where it will exit since, with the barrier down, the closure will be up. By swinging the barrier 65 by the handle 75, to the dotted position in Figure 2, the barrier 65 may be swung upwardly, out of the way (as in Figure 7) of the material within the vessel 11 and the closure 34 will move downwardly to close the mouth 27. So as to limit the horizontal swinging movement of the arm 74, an upwardly-extending stop may be disposed, one stop 78 to one side of the arm 74 and one stop 79 to the other side thereof, these stops being spaced apart to permit the necessary limiting horizontal swing of the arm 74.

From the foregoing, it will be seen that manipulation of the barrier 65 (swinging and raising or lowering thereof) will also cause vertical movement of the closure 34. Thus, without stopping the rotation of the vessel 11 (when the material therein has become properly comminuted), the barrier may be swung to the lowered position of Figure 8 and the closure raised, permitting discharge of the comminuted material. With the barrier lowered, it would be difficult, if not hazardous, to reach into the vessel and raise the closure 34 by hand.

It has been found desirable to provide guard means 16 which may be arcuate plates 80, disposed 180° apart and, as shown particularly in Figures 1 and 3, positioned to extend from slightly below the mouth of the vessel 11 upwardly to positions above the horizontal planes of the topmost edges of the largest-diametered disc cutters 36 whereby material carried along the faces of the cutters will not be projected from the vessel 11 but will strike the guards and probably drop back into the vessel. These guards 80 may be secured to the arms 46 and have vertical slots to accommodate the shafts 38.

The comb means 17, shown particularly in Figures 10 and 11, may include a plurality of teeth 85 secured at their upper ends to a support 86 which may be detachably secured, as by nut and bolt means 87 to the platform 45 so that a tooth 85 extending downwardly, preferably angularly, as shown in Figure 1, between each cutter 35 and outwardly of the outer faces of each outermost cutter 35 and spaced therefrom a short distance sufficient to enable the teeth to comb comminuted material from the rotating cutters 35. The extreme lower ends of the teeth may be arcuate as at 88 to curve around the lowermost periphery of an associated spacer 39.

Various changes in the shape, size, and arrangement of parts may be made to the form of invention herein shown and described without departing from the spirit of the invention or the scope of the claims.

I claim:

1. In a material comminuter, a support, a rotatable vessel having a bottom wall, a vertical wall and an exit mouth in said bottom wall at substantially the axis of rotation of said vessel, a vertically movable closure for said mouth, means to comminute material within said vessel, means to rotate said vessel upon said support on a substantially vertical axis and to operate said comminuting means, and means movable to guide comminuted material within said vessel toward said mouth and, at the same time, raise said closure to uncover said mouth, including a vertically-reciprocable barrier extending, when in one position, across said vessel from closely adjacent said vertical wall to closely adjacent said mouth, said barrier extending non-radially with respect to the axis of rotation of said vessel, and a flexible connection between said barrier and closure.

2. In a material comminuter a support, a rotatable vessel having a bottom wall and a vertical wall and an exit mouth in said bottom wall at substantially the axis of rotation of said vessel, a vertically movable closure for said mouth, means to comminute material within said vessel, a second support carried by said first-named support and spaced above said vessel, means to rotate said vessel upon said support on a substantially vertical axis and to operate said comminuting means, and means movable to guide comminuted material within said vessel toward said mouth and, at the same time, raise said closure to uncover said mouth, including a vertically-reciprocable barrier extending, when in one position, across said vessel from closely adjacent said vertical wall to closely adjacent said mouth, said barrier extending non-radially with respect to the axis of rotation of said vessel, and a flexible connection between said barrier and closure extending to and from said second support.

3. In a material comminuter a support, a rotatable vessel having a bottom wall, a vertical wall and an exit mouth in said bottom wall at substantially the axis of rotation of said vessel, a vertically movable closure for said mouth, means to comminute material within said vessel, a second support carried by said first-named support and spaced above said vessel, means to rotate said vessel upon said support on a substantially vertical axis and to operate said comminuting means, and means movable to guide comminuted material within said vessel toward said mouth and, at the same time, raise said closure to uncover said mouth, including a vertically-reciprocable barrier extending, when in one position, across said vessel from closely adjacent said vertical wall to closely adjacent said mouth and extending, when in another position, angularly with respect to said vertical wall and spaced from said bottom wall, said barrier extending when in both of said positions, non-radially with respect to the axis of rotation of said vessel and being provided with a horizontally-extending rigid arm, means pivoting the free end of said arm for vertical and horizontal swinging thereof, a guideway carried by said second support, and a flexible connection between said barrier and closure, extending from said closure upwardly to and thence downwardly through said guideway and thence downwardly from said guideway to said closure.

4. In a material comminuter a support, a rotatable vessel having a bottom wall, a vertical wall and an exit mouth in said bottom wall at substantially the axis of rotation of said vessel, a vertically movable closure for said mouth, means to comminute material within said vessel, a second support carried by said first-named support and spaced above said vessel, means to rotate said vessel upon said support on a substantially vertical axis and to operate said comminuting means, and means movable to guide comminuted material within said vessel toward said mouth and, at the same time, raise said closure to uncover said mouth, including a vertically swingable barrier extending, when in one position, across said vessel from closely adjacent said vertical wall to closely adjacent said mouth and extending when, in another position, angularly with respect to said vertical wall and spaced from said bottom wall, said barrier extending, when in both of said positions, non-radially with respect to the axis of rotation of said vessel and being provided with a horizontally-extending rigid arm having a horizontally extending pivot at its free end, a vertically-extending, vertically pivoting rod having upwardly-extending arms carried by said second support with the pivot of said rigid arm extending through said upwardly-extending arms, means limiting movement of said rigid arm upon movement of said barrier into either of said positions, a guideway carried by said second support and extending upwardly and outwardly therefrom, and a flexible connection between said barrier and closure, extending from said closure upwardly to and thence downwardly through said guideway and thence downwardly from said guideway to said closure.

5. In a material comminuter, a support, a vessel having a bottom wall, an upwardly-extending outer wall projecting therefrom, and an exit opening in the bottom wall, a closure for said opening, means to rotate said vessel upon said support, comminuting means within said vessel, and means movable to guide comminuted material within said vessel toward said mouth and, at the same time, move said closure to uncover said mouth, including a vertically-reciprocating barrier extending, when in one position, across said vessel from closely adjacent said upwardly-extending outer wall to closely adjacent said opening, and a flexible connection between said barrier and closure.

JOHN A. HOHMAN.

REFERENCES CITED

The following references are of record in the file of this patent:

UNITED STATES PATENTS

| Number | Name | Date |
|---|---|---|
| 203,201 | Schiller | Apr. 30, 1878 |
| 335,730 | Zies | Feb. 9, 1886 |
| 1,980,304 | Van Hoozdonk | Nov. 13, 1934 |
| 2,257,672 | Christensen | Sept. 30, 1941 |

FOREIGN PATENTS

| Number | Country | Date |
|---|---|---|
| 39,022 | Austria | Sept. 25, 1909 |